United States Patent [19]
Hoover et al.

[11] 3,749,911
[45] July 31, 1973

[54] COLLIMATOR OF MULTIPLE PLATES WITH AXIALLY ALIGNED IDENTICAL RANDOM ARRAYS OF APERTURES

[75] Inventors: Richard B. Hoover, Huntsville, Ala.; James H. Underwood, Bowie, Md.

[73] Assignee: The United States of America as represented by the Administrator of the National Aeronautics and Space Administration, Washington, D.C.

[22] Filed: June 30, 1970

[21] Appl. No.: 51,317

[63] Continuation-in-part of Ser. No. 11,220, Feb. 13, 1970, abandoned.

[52] U.S. Cl. .............................. 250/65 R, 250/105
[51] Int. Cl. ............................................. G03b 41/16
[58] Field of Search ..................... 250/62, 63, 65 R, 250/71.5 S, 105

[56] References Cited
UNITED STATES PATENTS

| | | | |
|---|---|---|---|
| 3,324,294 | 6/1967 | McGrath et al. | 250/105 |
| 3,011,057 | 11/1961 | Anger | 250/71.5 |
| 3,585,387 | 6/1971 | Bramlet | 250/71.5 |
| 3,259,747 | 7/1966 | Ziegler | 250/65 |
| 3,412,246 | 11/1968 | Horwitz et al. | 250/105 X |

*Primary Examiner*—William F. Lindquist
*Attorney*—L. D. Wofford, Jr., A. H. Tischer and John R. Manning

[57] ABSTRACT

A collimator is disclosed for examining the spatial location of distant sources of radiation and for imaging by projection, small, near sources of radiation, the collimator consisting of a plurality of plates, all of which are pierced with an identical random array of apertures. The plates are mounted perpendicular to a common axis, with like apertures on consecutive plates axially aligned so as to form radiation channels parallel to the common axis. For near sources the collimator is interposed between the source and a radiation detector and is translated perpendicular to the common axis so as to project radiation traveling parallel to the common axis incident to the detector. For far sources the collimator is scanned by rotating it in elevation and azimuth with a detector to determine the angular distribution of the radiation from the source.

2 Claims, 2 Drawing Figures

PATENTED JUL 31 1973

INVENTORS,
RICHARD B. HOOVER,
JAMES H. UNDERWOOD

BY *Archer & Fischer*
*McCoy*
ATTORNEYS

COLLIMATOR OF MULTIPLE PLATES WITH AXIALLY ALIGNED IDENTICAL RANDOM ARRAYS OF APERTURES

ORIGIN OF THE INVENTION

The invention described herein was made by employees of the United States Government and may be manufactured and used by or for the Government of the United States of America for governmental purposes without the payment of any royalties thereon or therefor.

This application constitutes a continuation-in-part of co-pending application entitled "Multiple Plate Multiple Pinhole Camera," Ser. No. 11220, filed Feb. 13, 1970, now abandoned.

BACKGROUND OF THE INVENTION

This invention relates to optical collimators useful at very short wavelengths and more particularly to a collimator useful for investigating near and far sources of extreme ultraviolet, x-radiation, gamma radiation and neutron radiation.

Presently there are many applications, especially in the field of nuclear medicine, where it is desirable to produce good, high resolution images of relatively small x-ray and gamma ray sources at a finite distance. For example, it is known that the tissues of a brain tumor will absorb the radioactive isotope Technetium 99. After absorption, the tumor acts as a small source of 140 kev gamma rays. Physicians and surgeons have in the past attempted to locate these tumors with the use of gamma ray "collimators" that consist of a sheet of lead in which several large holes have been drilled. The devices characteristically contain 19 to 61 holes of three-fourths inch diameter, with the holes drilled at an angle so that lines through the center of the hole and parallel to its length tend to converge in the region of the tumor. These devices however, do not yield a true image of the tumor and may be used to locate the tumor to a precision of only a few millimeters. Another disadvantage with devices of this type lies in the fact that some radiation can leak through the hole walls and consequently the point spread function is characteristically rather wide and has broad side lobes.

Other apparatus and methods for viewing x-ray and gamma ray sources include glancing incidence optical systems. These systems however, depend upon the property of total reflection and can be used only with soft x-rays, i.e., energy less than 12 kev. High energy electromagnetic radiation, neutrons and other particles cannot be imaged with glancing incidence optical systems.

Besides applications related to investigation of near sources of radiation, applications also exist using collimators to precisely locate the position of infinitely distant sources such as cosmic x-ray sources. One collimator useful for such an application is described in the U.S. Pat. No. 3,324,294 to John F. McGrath. The collimator described by McGrath is composed of plates pierced with holes arranged in a regular array and uses a plurality of plates harmonically spaced to suppress off-axis radiation. The resulting structure however, requires many auxilary plates if subsidiary beams are to be suppressed out to a large angle and becomes impractical for sources which subtend a large angle.

Accordingly, an object of this invention is to provide an improved optical collimator useful for investigation of both far and near sources of radiation.

Another object of the present invention is to provide an apparatus for obtaining high quality images of relatively small, near sources of x-rays, gamma rays, neutrons and other forms of radiation.

Another object of the present invention is to provide a collimator having high angular resolution.

SUMMARY OF THE INVENTION

In accordance with the present invention, these and other objects may be accomplished with the use of a novel collimator that transmits radiation traveling parallel to its optical axis and eliminates off-axis radiation. The collimator consists of a plurality of plates, all of which are pierced with an identical random array of apertures. The plates are mounted perpendicular to a common or optical axis with like apertures on consecutive plates axially aligned. The collimator, if interposed between a near source of radiation and a radiation detector, transmits radiation traveling parallel to its optical axis to produce an image that is an array of dots corresponding to the apertures in the plates and confined to the boundaries of the source. To obtain an accurate representation of the intensity distribution of the source (i.e., fill in the image) the collimator may be translated perpendicular to its optical axis. During this translation the source and detector remain motionless.

BRIEF DESCRIPTION OF THE DRAWING

These and other objects and advantages will be more apparent upon reference to the following specification, appended claims and drawing wherein:

DESCRIPTION OF THE PREFERRED EMBODIMENT

Figure 1:
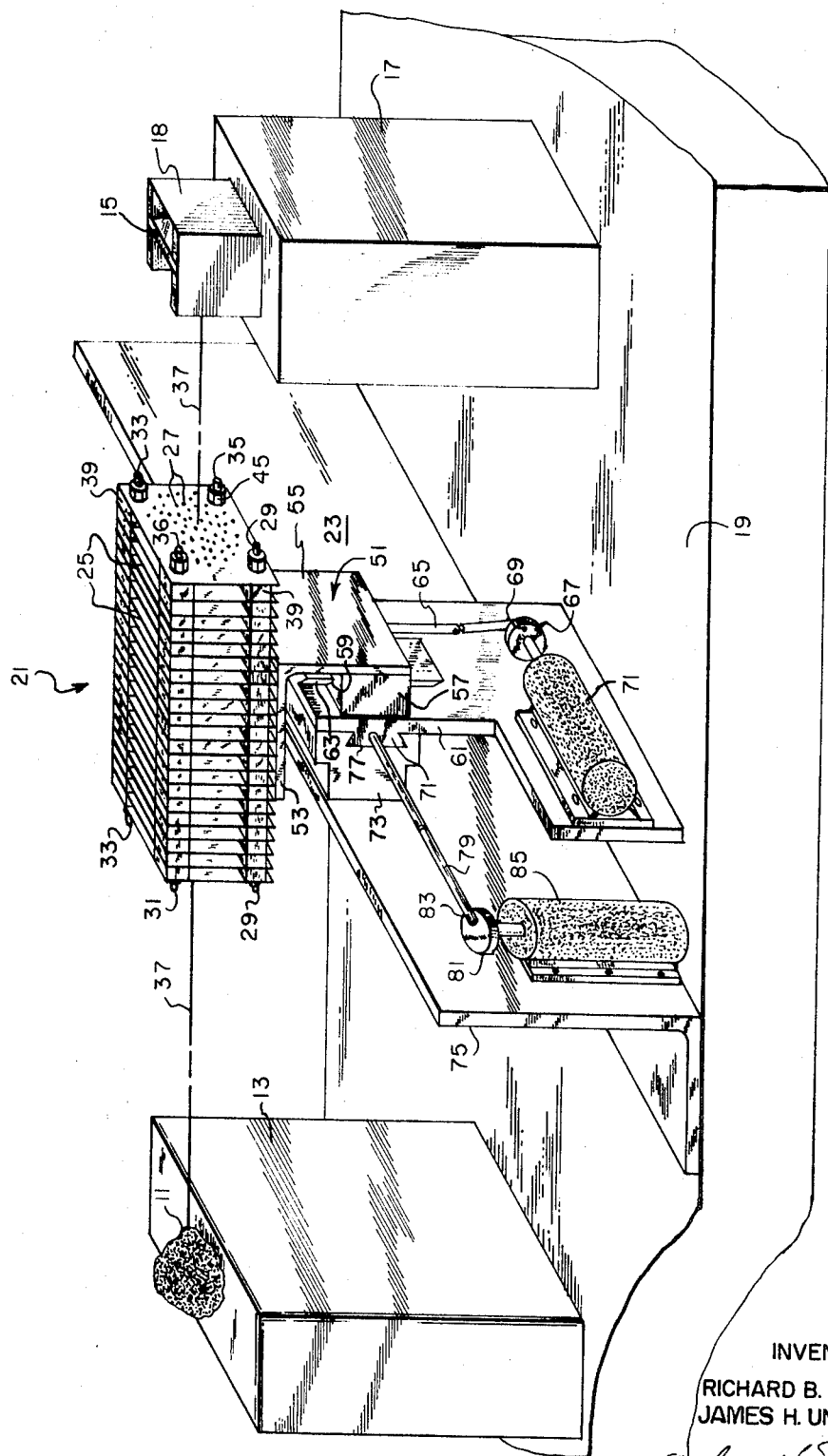
FIG. 1 is a perspective view of a multiple plate multiple pinhole camera constructed in accordance with this invention.

With reference to FIG. 1, there is illustrated an arrangement for imaging a small source of radiation 11 onto an appropriate radiation detector i.e., photographic plate 15, with the use of the unorthodox "lens" or collimator 21 constructed in accordance with the teachings of the present invention. The radiation detector used, must of course be responsive to the particular radiation emitted by the source 11 and with x-radiation or gamma radiation could alternately take the form of a fluorescent screen, photo-electric cells, proportional counter arrays or the like. The plate 15 is supported by a holder 18, with the source 11 and the holder 18 sitting respectively on platforms 13 and 17, which in turn sit on table 19.

Interposed between the radiation source 11 and the photographic plate 15 is the collimator 21, supported by a carriage unit 23. The collimator 21 consists of a plurality of plates, such as rectangular shaped plates 25, all of which are pierced with an identical random array of apertures, such as pinholes 27. (See R. B. Hoover, American Journal of Physics, Vol. 9, pages 871–876 (1969) for a discussion of tecniques for fabrication of plates containing a random array of apertues of various shapes.) Rods 29, 31, 33 and 35 extend respectively through mounting holes (not shown) formed in the respective corners of each of the plates 25 so as to axially align like pinholes on consecutive plates parallel to a common axis hereinafter referred to as optical axis 37. Horseshoe shaped spacers 39 are inserted around the rods 29, 31, 33 and 35 between consecutive plates so as to maintain a desired spacing between adjacent plates. Both ends of the respective rods 29 31, 33 and 35 are threaded to receive nuts, i.e., 47, by means of which the plates 25 are prevented from slipping on the rods.

Figure 2:
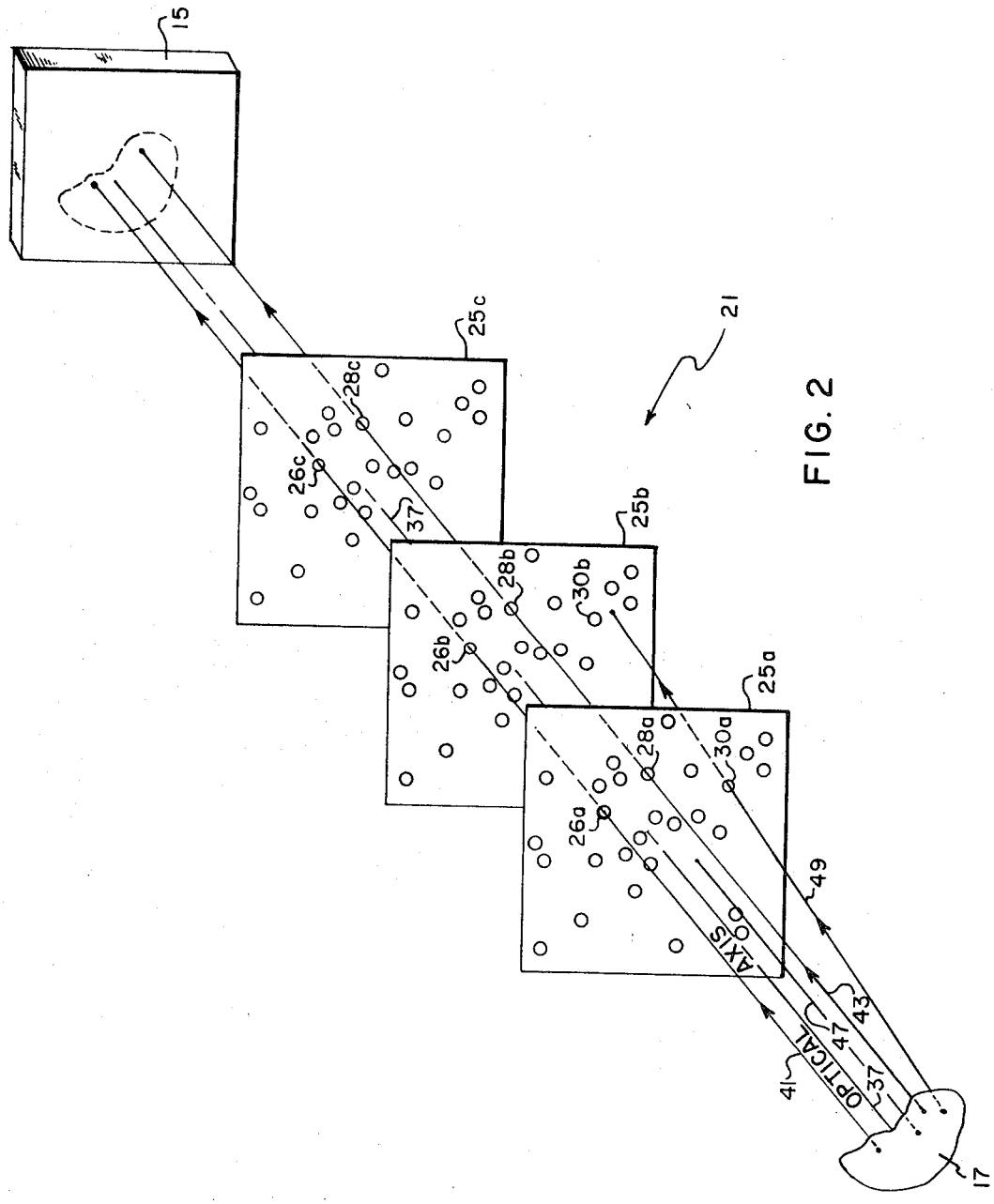
FIG. 2 is a radiation ray diagram useful in understanding the collimator used in the camera of FIG. 1.

The operation of the embodiment thus far described may best be understood with reference to FIG. 2, wherein there is shown a radiation ray diagram. For purposes of explanation, only three of the plates 25 of the collimator 21 described in FIG. 1 are shown and are identified as plates 25a, 25b and 25c. The source 11 is shown in outline form so as to show the boundaries of the source in the plane perpendicular to the optical axis 37 of the collimator 21. The photographic plate 15 is positioned so that its surface is substantially perpendicular to optical axis 37. As may readily be seen, rays, i.e., 41 and 43, which are travelling parallel to the optical axis 37 and which pass through a given pinhole in the plate 25a, pass through the same corresponding pinhole in every successive plate, that is plates 25b and 25c, and are then incident on the detector 15. In particular, ray 41 passes through pinholes 26a, 26b and 26c, respectively, of plates 25a, 25b and 25c while ray 43 passes through pinholes 28a, 28b and 28c, respectively, of plates 25a, 25b and 25c. A ray that is travelling in a direction not perfectly parallel to the optical axis 37 will either strike a solid area of plate 25a, i.e., ray 47, or will strike a solid area of a subsequent plate, i.e., ray 49 travels through pinholes 30a of plate 25a but is displaced from pinhole 30b of plate 25b.

If there are $N$ apertures or pinholes on each plate, each with an area $\delta$ and if the total area of the plate is $\Sigma$, then the transmission or response $R(\alpha,B)$ through one plate for parallel radiation incident at an off axis angle equal to $\alpha$ in the direction parallel to the X axis and an angle equal to $B$ in the direction parallel to the Y axis is:

$$R(\alpha,B) = (N\delta)/\Sigma = T \quad (1)$$

Then the transmission or response $R(O,O)$ for rays parallel to the optical axis 37 of the collimator is the ratio of the transparent area to the total area of the plate regardless of the number of plates used.

For rays that are not parallel to the optical axis, the transmission which occurs is simply due to accidental coincidences of different pinholes in the random arrays, and to leakage of radiation through the solid portion of the plates. Since the pinholes are randomly distributed, the transmission of off-axis rays is determined entirely by the number of plates used and the transmission of each plate.

As shown in equation 1 the probability of the radiation getting through the first plate is $T$. Since it passes through the first plate at an angle $(\alpha,B)$ to the optical axis, the radiation sees a new distribution of holes when it approaches the second plate (since there is no spatial correlation between pinholes of a single plate) and the probability of its getting through the second plate is also $T$, so that the average probability of the radiation getting through two plates is $T^2$ or $$< R(\alpha,B) >_{av} = T^2 \quad (2)$$

If $n$ plates are used, equation 2 becomes $$<R(\alpha,B)>_{av}=T^n$$

It is noted that the spacings between the plate is not critical and would not have to be accurately controlled as in the case of the prior art collimators consisting of a plurality of plates each having a regular array.

It may be seen that by using sufficient number of plates the transmission for these off-axis rays may be made negligibly small. Also by proper choice of the thickness and type of material of the plates, for the radiation under consideration, the solid part of the plates will attenuate the leakage radiation to an acceptable level.

One illustrative embodiment for imaging gamma rays was constructed in accordance with the invention as follows: the collimator comprised 15 plates each having a thickness of 20 mils and composed of tungsten; each plate contained 2,500 pinholes restrained to a four inch by four inch area with each pinhole having a 50 mil diameter, and the plates were mounted such that distance between end plates was 10 inches.

It is seen that the collimator 21 transmits substantially only those rays emitted by the source which are propagating parallel to the optical axis 37. This will yeild a direct one to one mapping of points in the source into corresponding points on the detector that are constrained to the boundaries of the source in a plane perpendicular to the optical axis of the lens. In order to "fill-in" the image, the collimator may be translated perpendicular to its optical axis while the image is being recorded by the detector 15.

Referring again to FIG. 1 and in particular to carriage 23, there will be described an embodiment for accomplishing the translation of collimator 21 perpendicular to its optical axis.

The collimator 21, as previously stated, is supported by the carriage unit 23 between the source 11 and the photographic plate 15. In particular, the carrige 23 includes a platform 51 having a horizontally extending portion 53 and a vertically extending portion 55, the latter being welded to a block 57 having a dovetail groove 59 formed in its back surface, the groove 59 being parallel to portion 55 and perpendicular to portion 53. Plate 61, having dovetail extension 63 formed on its front surface, is mounted for sliding movement in the groove 51. A hinged rod 65 is secured on one side to the bottom of block 57 (not shown) and is pivotally connected on its opposed end by pin 69 off center on a cam 67 driven by motor 71, whereby rotation of cam 67 causes up and down movement of block 57 and platform 51.

Plate 61 has formed on its back side a dovetail extension 71 extending perpendicular to extension 63. A block 73, welded to the vertical surface of a beam 75 and having a dovetail groove 77 on its front surface extending perpendicular to groove 59, receives the extension 71. A hinged rod 79 secured on one end to the side of plate 61 and pivotally connected off center to cam 81 by pin 83 is driven by motor 85 to impart side to side movement of plate 61 and platform 51.

In operation, it will be readily apparent that the rotation of cam 81 and 67 will cause an orbital or rotational movement of collimator 21 perpendicular to its optical axis 37 thereby allowing a continuous picture of the source 11 to be projected incident to the detector 15.

Because the collimator 21 accepts radiation from a single direction only, other uses will be apparent to those skilled in the art. For example, the collimator may be used to determine the angular distribution of radiation emitted from far sources such as the Sun and other celestial objects. This may be accomplished by scanning the collimator in its azimuth and elevation together with a radiation detector.

Accordingly, it should be understood that this disclosure is for the purpose of ilustration only and that the invention includes all modifications and equivalents falling within the scope of the appended claims.

What is claimed is:

1. An apparatus for use in imaging by projection small near sources of penetrating radiation comprising:
   a substantially plane surface on which it is desired to image said source of radiation;
   a plurality of plates, each of said plates provided with an identical random array of apertures, said plates being constructed of radiation absorbing material;
   mounting means for holding each of said plates perpendicular to a common axis, with each of said plates spaced an incremental distance from one another and with like apertures on consecutive plates axially aligned so as to form radiation channels parallel to said common axis through said mounted plates;
   positioning means for holding said mounted plates between said source of radiation and said plane surface so that said plates are maintained substantially parallel to said plane surface;
   first means cooperating with said positioning means to translate said mounted plates in a first direction perpendicular to said common axis;
   second means cooperating with said positioning means to translate said mounted plates in a second direction perpendicular to said common axis, said first and second cooperating means being structurally arranged so that said second direction of translation is perpendicular to said first direction of translation; and
   a radiation detector mounted on said plane surface.

2. The apparatus of claim 1 wherein said radiation detector is a photographic plate.

* * * * *